Aug. 11, 1925.
C. F. HUTCHINGS
SHOCK ABSORBER
Filed Jan. 13, 1925
1,549,311
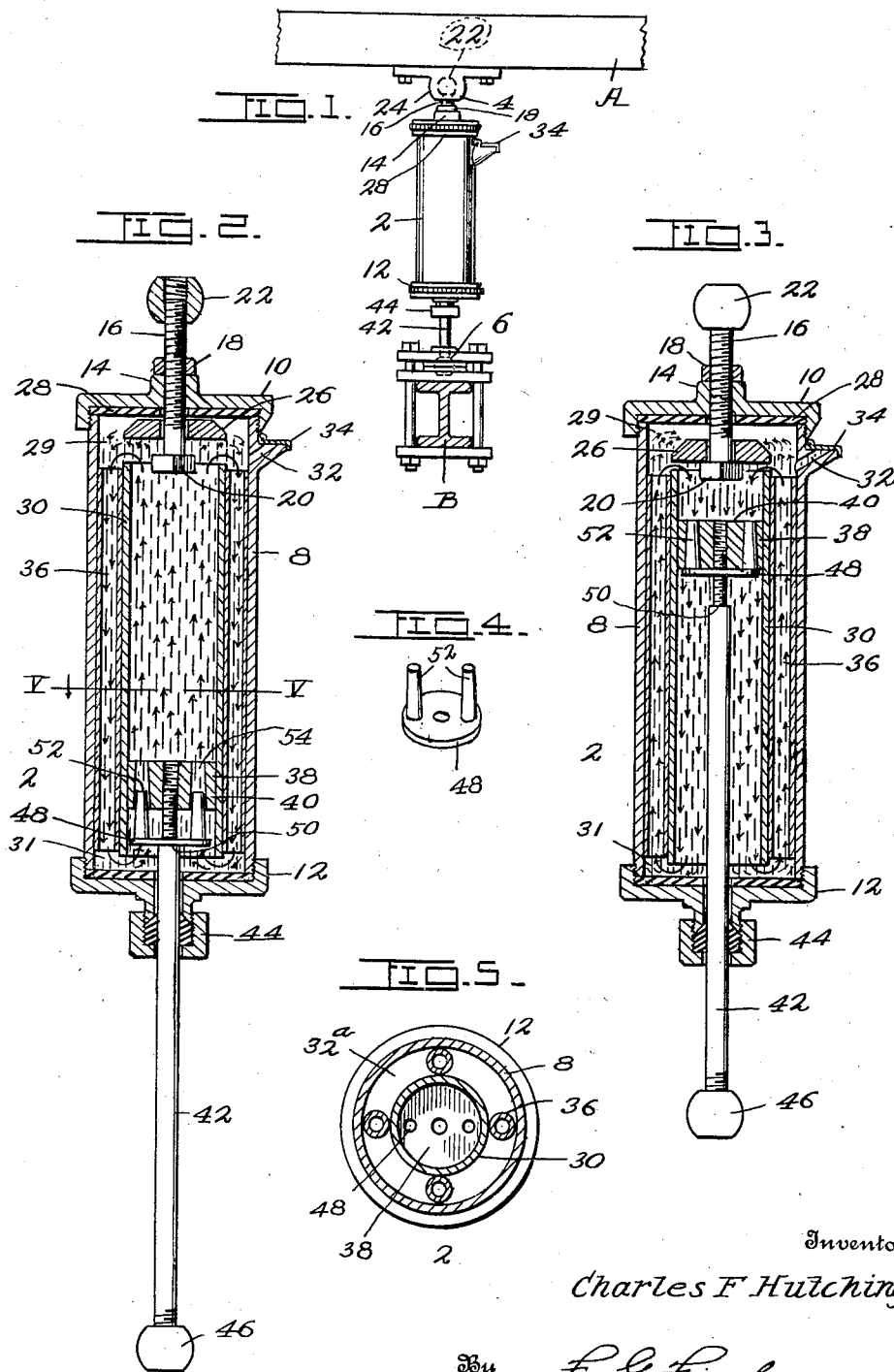
Inventor:
Charles F Hutchings,
By F. G. Fischer,
Attorney.
Witness:
Fred G. Fischer.

Patented Aug. 11, 1925.

1,549,311

UNITED STATES PATENT OFFICE.

CHARLES F. HUTCHINGS, OF SAN FRANCISCO, CALIFORNIA.

SHOCK ABSORBER.

Application filed January 13, 1925. Serial No. 2,168.

*To all whom it may concern:*

Be it known that I, CHARLES F. HUTCHINGS, a citizen of the United States, residing at San Francisco, in the county of San Francisco and State of California, have invented certain new and useful Improvements in Shock Absorbers, of which the following is a specification.

My invention relates to hydraulic shock absorbers for motor vehicles and my object is to provide a relatively simple and inexpensive device of this character whereby shocks incident to a vehicle traveling over a rough road may be absorbed or modified to such extent as to be hardly noticeable to passengers riding in said vehicle.

In carrying out the invention I employ a piston which acts to circulate oil or other suitable liquid, the flow being regulated by a valve which may be adjusted to retard the speed of circulation to accommodate the load acting on the shock absorber.

Other features will hereinafter appear and in order that the invention may be fully understood, reference will now be had to the accompanying drawing, in which:

Fig. 1 is a side elevation of one of the shock absorbers applied to a portion of a motor vehicle.

Fig. 2 is an enlarged vertical section of the shock absorber.

Fig. 3 is a view similar to Fig. 2, with the working parts in a different position.

Fig. 4 is a detail of a pair of relief valves.

Fig. 5 is a cross section on line V—V of Fig. 2.

Referring now in detail to the various parts, A designates one of the main side bars of the chassis and B the axle of a motor vehicle to which a shock absorber 2 is freely connected by universal joints 4 and 6, respectively.

The shock absorber 2 embodies an external cylinder 8 which is closed at its upper and lower ends by caps 10 and 12, respectively. The upper cap 10 is provided with an internally threaded boss 14 in which a screw 16 is adjustably mounted. Said screw 16 is secured at any point of its adjustment by a lock nut 18 and provided at its lower end with a head 20 and at its upper end with a ball 22 forming a portion of the universal joint 4, the socket 24 of which is fixed to the frame member A.

A floating valve 26 is loosely mounted on the screw 16 and restricted in its vertical movements by the screw head 20 and a gasket 28, which latter is interposed between the upper end of the external cylinder 8 and the cap 10 to provide a liquid-tight joint. The valve 26 is arranged adjacent to the upper end of an internal cylinder 30 to regulate the flow therethrough of a liquid, such, for instance as oil, which is introduced into the external cylinder 8 through a filler opening 32, provided with a dust cap 34. The filler opening 32 is spaced a suitable distance below the upper end of the external cylinder 8, to prevent the introduction of a surplus of liquid which would retard the movements of the internal working parts of the shock absorbers to too great an extent.

The internal cylinder 30 is shorter than the external cylinder 8 to leave intervening passageways 29 and 31 at the top and bottom, respectively, and said internal cylinder 30 is of sufficiently less diameter than the interior of the cylinder 8 to leave a passageway 32$^a$, which communicates with the passageways 29 and 31. The inner and outer cylinders are firmly connected by longitudinal tubes 36.

38 designates a piston embodying a piston head 40, reciprocably mounted in the internal cylinder 30, and a piston rod 42 extending through a stuffing box 44 depending from the cap 12. The piston rod 42 is provided at its lower end with an adjustably mounted ball 46 forming part of the universal joint 6 and is threaded or otherwise adjustably connected at its upper end to the piston head 40 to restrict the vertical movements of a member 48, normally resting upon a shoulder 50 formed on said piston rod 42.

The member 48 is provided with a suitable number of tapered plungers 52 for controlling the flow of the liquid into and out of corresponding relief chambers 54 extending vertically through the piston head 40.

In practice the balls 22 and 46 are adjusted on the screw 16 and the piston rod 42, respectively, according to the normal distance between the side bar A and the axle B, and to position the piston head 40 at a point approximately midway between the upper and lower ends of the internal cylinder 30, so that said piston head 40 and the external cylinder 8 will have sufficient leeway to move up and down independently of each other without said piston head 40 contacting the screw head 20 or the cap 12 when the car is traveling on a rough road. Should an obstruction in the road cause the cylinders 8 and 30 to move downwardly, or the piston 38 to move upwardly, the liquid is circulated from the upper to the lower portion of said piston through the passageways 29, 31, 32ª, and the tubes 36, as shown by the arrows Fig. 2, and undue shock to the passengers is avoided by the retarding effect of said liquid. As the piston rod moves upwardly in the cylinder 30 it reduces the capacity of the same accordingly and would unduly retard the inflow of the liquid at the lower end of the cylinder 30, excepting that the plungers 52 are forced open by the pressure of the liquid thereon and open the relief chambers 54, which receive an amount of liquid approximately equal to that which is displaced from the lower portion of the cylinder 30 by the piston rod 42. Sudden recoil of the vehicle springs is prevented on the downward movement of the piston 40 which reverses the flow of the liquid by forcing it upwardly through passageway 32ª and the tubes 36. As the piston 40 moves downwardly the plungers 52 close the chambers 54, so that oil cannot flow upwardly therethrough. The valve 26 is forced downwardly against the screw head 20 by the pressure of the liquid entering the upper portion of the internal cylinder 30, and thereby retards the circulation of the liquid and the downward movement of the piston head 40. Retardation of the flow of liquid by the valve 26 is regulated to suit the load by adjusting the screw 16 up or down, but in no instance is said screw lowered sufficiently to permit the valve 26 to become seated against the upper end of the internal cylinder 30. Two or four shock absorbers may be applied to a vehicle, as preferred, and they may be located at the most advantageous points on said vehicle.

From the foregoing description it is apparent that I have provided a shock absorber embodying the advantages above pointed out, and while I have shown and described the preferred construction, combination and arrangements of parts, it is to be understood that I reserve the right to make such changes as properly fall within the spirit and scope of the invention as claimed.

Having thus described my invention, what I claim and desire to secure by Letters Patent, is:

1. A shock absorber of the character described consisting of exterior and interior cylinders spaced apart to leave communicating passageways for the circulation of a liquid, a piston reciprocably mounted in said interior cylinder to circulate the liquid, a valve mounted between the cylinders to retard the circulation of the liquid therethrough, an element threaded through one end of the exterior cylinder and upon which said valve is operably mounted, and means for connecting said threaded element to a vehicle.

2. A shock absorber of the character described consisting of exterior and interior cylinders spaced apart to leave communicating passageways for the circulation of a liquid, a piston reciprocably mounted in said interior cylinder to circulate the liquid and provided with relief chambers to admit a portion of said liquid, a member having limited movement on the piston stem, and plungers mounted on said member for expelling the liquid from said chambers.

3. A shock absorber of the character described consisting of exterior and interior cylinders spaced apart to leave communicating passageways for the circulation of a liquid, a piston reciprocably mounted in said interior cylinder to circulate the liquid and provided with a stem extending through one end of the exterior cylinder, means at the outer end of said piston stem for connecting the same to a motor vehicle, a valve mounted between the cylinders to retard the circulation of the liquid, an element extending through the end of the exterior cylinder opposite to the end through which the piston stem extends and upon which said valve is operably mounted, and means for connecting the outer end of said element to the motor vehicle.

In testimony whereof I affix my signature, in the presence of two witnesses.

CHARLES F. HUTCHINGS.

Witnesses:
 I. Z. RAY,
 E. R. BYXBEE.